United States Patent [19]

Tomabechi

[11] 4,309,733
[45] Jan. 5, 1982

[54] CHANGEOVER MECHANISM FOR THE MAGNETIC HEADS OR PINCH ROLLERS OF AN AUTOMATIC REVERSE TAPE RECORDER

[75] Inventor: Hideo Tomabechi, Hachioji, Japan
[73] Assignee: Olympus Optical Co., Ltd., Tokyo, Japan
[21] Appl. No.: 98,049
[22] Filed: Nov. 28, 1979
[30] Foreign Application Priority Data

Dec. 25, 1978 [JP]  Japan .................................... 53-160724

[51] Int. Cl.³ .......................... G11B 5/54; G11B 21/22
[52] U.S. Cl. ...................................... 360/105; 360/75; 360/96.1
[58] Field of Search ............. 360/105, 104, 109, 74.1, 360/74.2, 74.3, 74.5, 75, 96.2, 96.1

[56]  References Cited
U.S. PATENT DOCUMENTS

| | | | |
|---|---|---|---|
| 3,781,019 | 12/1973 | Kikuchi | 360/96.2 |
| 3,810,240 | 5/1974 | Nozawa | 360/96.2 |
| 4,214,283 | 7/1980 | Fushimi et al. | 360/96.4 X |

*Primary Examiner*—John H. Wolff

[57]  ABSTRACT

A changeover mechanism for the magnetic heads or pinch rollers comprises a pair of first movable levers, each of which is provided with a lever gear which is engaged with a reel gear and on the surface of which a stopper is mounted, a pair of electromagnetic solenoids, in each of which a movable rod is pulled outward upon receipt of a signal denoting to arrival of the end of a tape for engagement with the stopper of the lever gear to brake the rotation of the lever gear, thereby preventing the rotation of the lever gear itself and effecting the revolution of the lever gear about the reel gear for the drive of the first lever. The changeover mechanism further comprises a pair of second levers which is connected to the first lever, and, at the drive of the first lever, is rotated for engagement with the swingable magnetic head support board or pinch roller support board to rock it, thereby effecting the selective operation of the paired magnetic heads on the paired pinch rollers among themselves. Power required to swing the magnetic head support board or pinch roller support board is supplied by a motor through the reel gear, and the selective operation of the magnetic heads or pinch rollers among themselves is carried out simply by braking the rotation of the first lever upon receipt of a changeover instruction.

6 Claims, 4 Drawing Figures

CHANGEOVER MECHANISM FOR THE MAGNETIC HEADS OR PINCH ROLLERS OF AN AUTOMATIC REVERSE TAPE RECORDER

BACKGROUND OF THE INVENTION

This invention relates to a changeover mechanism for the magnetic heads or pinch rollers of an automatic reverse tape recorder.

An electromagnetic selenoid is widely applied as a changeover mechanism for the magnetic heads or pinch rollers of the customary automatic reverse tape recorder. In this case, a relatively large electromagnetic solenoid is generally used to ensure the retention of a required electromagnetic capacity, thus making it necessary to provide a large installation space and supply considerably large current. Noticeable electromagnetic noises produced in an electromagnetic solenoid through which large current flows exert such adverse effects on other electric circuits as can not be overlooked.

SUMMARY OF THE INVENTION

It is therefore an object of this invention to provide a changeover mechanism for the magnetic heads or pinch rollers of an automatic reverse tape recorder which occupies a small installation space and saves power consumption.

To attain the above-mentioned object, this invention provides a changeover mechanism for the magnetic heads or pinch rollers of an automatic reverse tape recorder, which comprises; a pair of first movable levers, each of which is provided with a reel gear which is engaged with a reel gear and on the surface of which a stopper is mounted; a pair of electromagnetic solenoids, in each of which the movable rod is pulled outward upon receipt of a signal denoting the arrival of the tape end to be engaged with the stopper of the lever gear, thereby preventing the rotation of the lever gear itself and causing the lever gear to revolve about the reel gear for the drive of the first lever; and a pair of second movable levers, each of which is connected to the first lever, and, at the drive of the first lever, is rotated to be engaged with a swingable magnetic head support board or pinch roller support board to rock it, thus effecting the selective operation of these members.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

DESCRIPTION OF THE PREFERRED EMBODIMENTS

Figure 1:
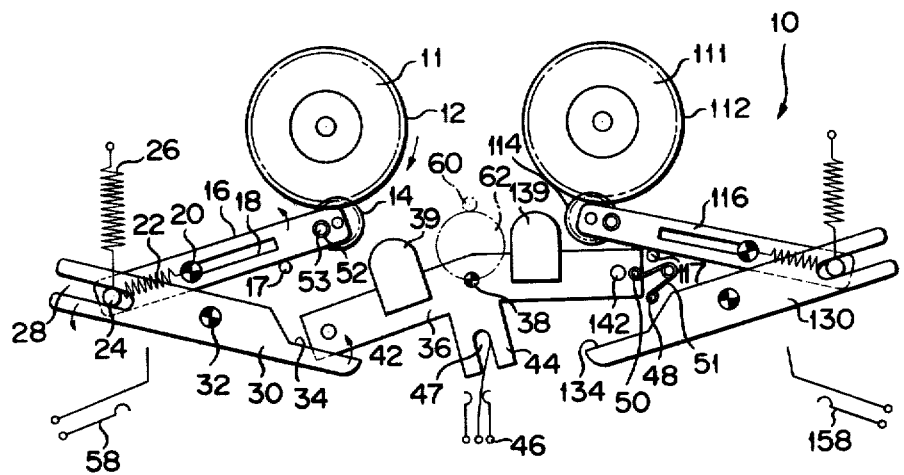
FIG. 1 is a top plan view of a changeover mechanism embodying this invention for the magnetic heads of a tape recorder, before the changeover operation is carried out.

There will now be described by reference to the accompanying drawings a changeover mechanism embodying this invention for the magnetic heads or pinch rollers.

Reference is first made to a changeover mechanism 10 for the selective operation of the magnetic heads of a center capstan type tape recorder. The drive force of a motor (not shown) is transmitted to the gears 12, 112 of the reels 11, 111 respectively through a drive system to drive the reels 11, 111 for the run of a tape. For briefness, reference is only made to the reel 11. As seen from FIG. 1, a first lever 16 having a gear 14 set at one end for engagement with a reel gear 12 is disposed adjacent to the reel 11. The lever gear 14 is engaged with the reel gear 12 in an inwardly displaced position, that is, on the right half side of the reel 11 as viewed from the rotating direction thereof. A stopper pin 17 is mounted on a fixed chassis (not shown) to prevent the clockwise rotation of the first lever 16. An elongated hole 18 extending lengthwise of the first lever 16 is cut out in the central portion thereof. A pin 20 set on the fixed chassis is fitted into the elongated hole 18, thereby allowing the lever 16 to be moved for a distance corresponding to the length of the elongated hole 18. The other end of the first lever 16 is fitted with a connector pin 24. A tension coil spring 22 is stretched between the aforesaid pin 20 and connector pin 24. Another tension coil spring 26 is stretched between the fixed chassis and connector pin 24.

A second lever 30 having a guide groove 28 formed at one end for the loose insertion of the pin 20 of the first lever 16 is disposed adjacent to the first lever 16. The second lever 30 is rotatably mounted on the fixed chassis by means of a pivotal pin 32, and is provided with a notch 34 at the other end. For better understanding of the drawing, pivotal pin acting as a rotation center is marked with the ⊕ in distinction from the other pins.

Levers 116, 130 constructed in the same manner as the levers 16, 30 are also arranged symmetrically with respect to the reel 111. The parts of the reel 111 are designated by reference numerals formed by adding a number of 100 to the reference numerals denoting the parts of the reel 11. A magnetic head support board 36 is swingably mounted on the fixed chassis by a pivotal pin 38 acting as the rotation center to occupy a position surrounded by the parts of the levers 11, 111. The magnetic head support board 36 is provided with a pair of magnetic heads 39, 139 symmetrically disposed with respect to the pivotal pin 38. One end of the magnetic head support board 36 is fitted with engagement pin 42 engageable with the surface of the notch 34 of the second lever 30. The other end of the magnetic head support board 36 is fitted with engagement pin 142 engageable with the surface of the notch 134 of the second lever 130. A forked attachment 44 is projectively formed in the central portion of one lateral side of the magnetic heat support board 36. The forked attachment 44 has an elongated hole 47 engageable with the movable contact of a switch 46 used to indicate which of the magnetic heads 39, 139 is currently projected toward a cassette tape. The magnetic support board 36 can be urged by a toggle spring 51 stretched between a pin 48 mounted on the fixed chassis and a pin 50 set on the magnetic head support board 36 in two directions with the midpoint (neutral point) of the rotation stroke of the support board 36 taken as the border. The clockwise or counterclockwise rotation of the magnetic head support board 36 about the pivotal pin 38 effects the selective projection of the magnetic heads 39, 139.

Figure 2:
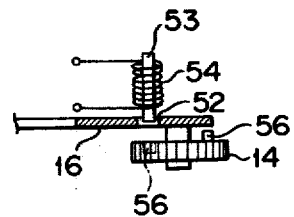
FIG. 2 is a fractional sectional view showing the relative positions of an electromagnetic solenoid and a first lever gear.

As shown in FIG. 2, an electromagnetic solenoid 54 is disposed above the first lever 16. The solenoid 54 is provided with a movable rod 53 which can be pulled out downward through a hole 52 cut out in the first lever 16. Mounted on the surface of the lever gear 14 is a stopper 56 which is engaged with the movable rod 53 of the solenoid 54 when it is pulled out downward, thereby preventing the rotation of the lever gear 14. The stopper 56 well serves the purpose, provided it can be engaged with the movable rod 53 of the solenoid 54 when it is pulled down. Consequently, the stopper 56 may take the form of the protuberance shown in FIG. 2, or a recess indicated in imaginary lines therein. Power supply to the electromagnetic solenoid 54 is cut off by a switch 58 (FIG. 1) which is actuated by engagement with the second lever 30 when it is rotated counterclockwise.

Reference numerals 60, 62 of FIG. 1 respectively denote a capstan and pinch roller disposed in the central part of the changeover mechanism 10.

Figure 3:
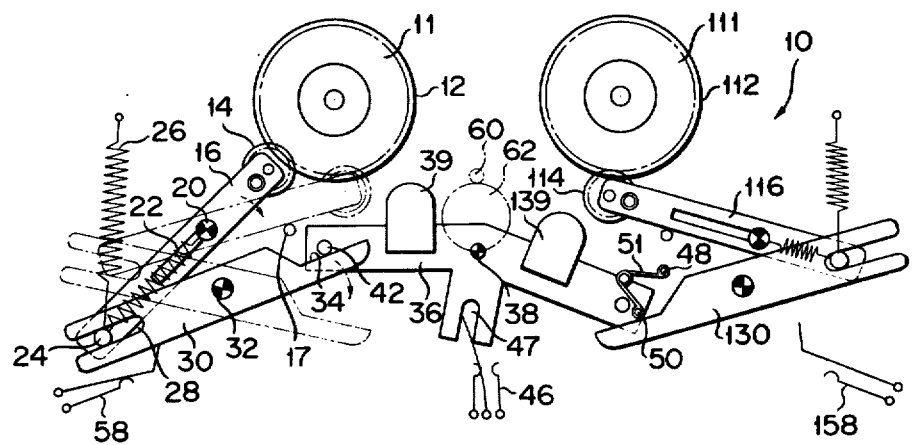
FIG. 3 is a plan view of the changeover mechanism of FIG. 1, after the changeover operation is carried out.

There will now be described the changeover mechanism 10 arranged as described above. Referring to FIG. 1, the reel 11 is rotated clockwise with the reel gear 12 during the run of a tape. The lever gear 14 is rotated in engagement with the reel gear 12. When the tape is taken up to the end, the coil of the electromagnetic solenoid 54 is supplied with power upon receipt of a signal generated by the customary means to denote the detection of the tape end. As a result, the movable rod 53 of the solenoid 54 is pulled out downward from the hole 52 cut out in the lever 16. The movable rod 53 thus drawn out is engaged with the stopper 56 mounted on the surface of the lever gear 14 to produce a braking force, thereby preventing the rotation of the lever gear 14. As a result, the lever gear 14 revolves clockwise about the reel gear 12, and the first lever 16 is rotated counterclockwise about the pivotal pin 20 against the urging force of the tension coil spring 22 along the periphery of the reel gear 12. Accordingly, the first lever 16 is moved, as shown in FIG. 3, until one end of the elongated hole 18 is pressed against the pivotal pin 20. The other pin 24 of the first lever 16 which is set at the opposite end thereof to the lever gear 14 is carried more outward through the guide groove 28 as the first lever 16 is rotated counterclockwise about the pivotal pin 20, thereby pressing the end of the forked attachment or the guide groove 28. A pressing force applied to the second lever 30 by the guide pin 24 through the guide groove 28 causes the second lever 30 to be rotated counterclockwise about the pivotal pin 32 acting as the rotation center. When the second lever 30 is rotated counterclockwise, then the surface of the notch 34 of the second lever 30 is pressed against the engagement pin 42 of the magnetic head support board 36 to transmit the moment of the counterclockwise rotation. As a result, the magnetic head support board 36 is rotated clockwise. The magnetic head support board 36 continues to be rotated, until the support board 36 goes beyond the neutral point of the toggle spring 51, and thereafter is immediately rotated to a prescribed position by the torsional force of the toggle spring 51 for the selective projection of the magnetic head 39. The rotation of the first and second levers 16, 30 causes the springs 22, 26 to be fully stretched for the accumulation of a tensional force.

As seen from FIG. 3, the second lever 30 is used to swing the magnetic head support board 36, and, when fully rotated, is pressed against the movable contact of the switch 58 of the electromagnetic solenoid 54 to actuate the switch 58. When the switch 58 is operated, power supply to the electromagnetic solenoid 54 is cut off, causing the movable rod 53 thereof to be retracted to a position in which said rod 53 is not engaged with the stopper 56. When the movable rod 53 of the solenoid 54 is released from the stopper 56, then the lever gear 14 is left free to rotate. As a result, the first lever 16 is rotated clockwise about the pivotal pin 20 acting as the rotation center by the torsional force accumulated in the spring 26 and is returned to the original position indicated in imaginary lines (FIG. 3) to be pressed against the stopper pin 17. Jointly with the movement of the first lever 16, the second lever 30 is rotated clockwise about the pivotal pin 32 acting as the totation center and regains the original position shown in imaginary lines (FIG. 3). The changeover operation for shifting the condition of the changeover mechanism 10 of this invention, for example, from the condition of FIG. 3 in which the magnetic head 39 is projected to the condition of FIG. 1 in which the magnetic head 139 is projected is carried out by the same operation as previously described of the first and second levers 116, 130 arranged close to the reel 111 and symmetrically with the aforesaid first and second levers 16, 30 relative to the magnetic head support board 36. The operation of the switch 46 is changed over for the selective projection of the magnetic heads 39, 139.

Figure 4:
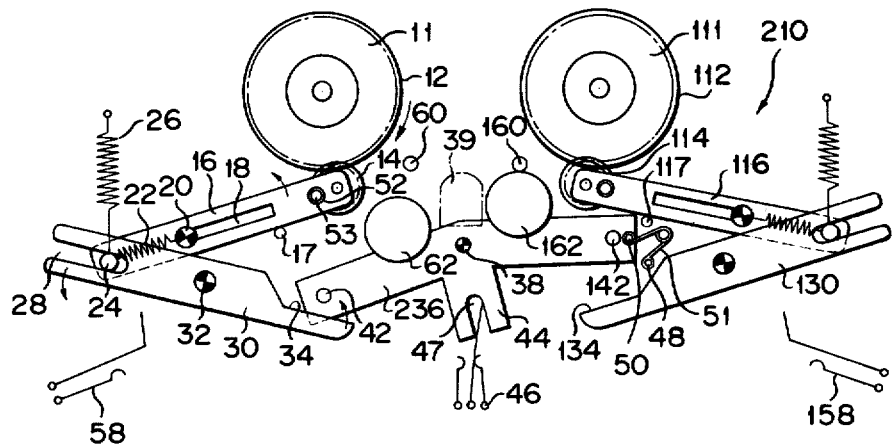
FIG. 4 is a top plan view similar to that of FIG. 1 of a changeover mechanism according to another embodiment of the invention for the pinch rollers of a tape recorder.

The foregoing embodiment relates to the case where, with the center capstan type tape recorder, the magnetic heads were selectively operated. However, this invention is obviously applicable to the case, where, with the center head type tape recorder, a pair of pinch rollers set on both sides of a single magnetic head are selectively operated. In other words, where, with the center capstan type tape recorder, the positions of the magnetic head and pinch roller used in the foregoing embodiment are exchanged for each other, then it is possible to provide the pinch roller changeover mechanism 210 shown in FIG. 4. With the pinch roller changeover mechanism 210 of FIG. 4, a magnetic head 39 is set in the center. A pinch roller support board 236 carriers a pair of pinch rollers 62, 162. A pair of capstan shafts 60, 160 are mounted on the fixed chassis. Except for the above-mentioned modification, the pinch roller changeover mechanism 210 of FIG. 4 has substantially the same arrangement as the aforesaid magnetic head changeover mechanism 10.

As mentioned above, the changeover mechanism embodying this invention for the magnetic heads or pinch rollers of a tape recorder comprises: a pair of first movable levers, each of which is provided with a reel gear which is engaged with a reel gear and on the surface of which a stopper is mounted; a pair of electromagnetic solenoids, in each of which a movable rod is pulled outward upon receipt of a signal denoting the arrival of the end of the tape for engagement with the stopper mounted on the surface of the lever gear to brake the rotation of the lever gear, thereby preventing the rotation of the lever gear itself and causing the lever gear to revolve about the reel gear for the drive of the first lever; a pair of second levers, each of which is connected to the first lever, and, at the drive of the first lever, is rotated to rock a swingable magnetic head support board or pinch roller support board by engagement therewith, thus effecting the selective operation of the magnetic heads or pinch rollers among themselves. With the changeover mechanism of this invention, power required to swing the magnetic head support board or pinch roller support board for the selective operation of a pair of magnetic heads or a pair of pinch rollers among themselves is supplied by a motor through the reel gear. The selective operation is effected simply by braking the rotation of the lever gear attached to the first lever upon receipt of a changeover instruction. Since the braking consumes a small force, a compact electromagnetic solenoid suffices, thus eliminating the necessity of installing a large capacity electromagnetic solenoid required for the prior art tape recorder. Further advantages of the changeover mechanism enbodying this invention are that the mechanism itself can be rendered compact to reduce an installation space and power consumption; and the occurrence of electromagnetic noises is suppressed, thereby substantially saving the other electric circuits from harmful effects.

What is claimed is:

1. A changeover mechanism for a pair of magnetic heads or pinch rollers of an automatic reverse tape recorder having a pair of reel gears, said mechanism comprising:
    a pair of first levers, each of which is provided with a lever gear which is respectively engaged with one of the reel gears and on the surface of which stopping means are provided;
    a pair of electromagnetic solenoids, in each of which a movable rod is provided which is pulled towards the respective lever gear, upon receipt of a signal denoting the arrival of the end of the tape, into engagement with the stopping means of the respective lever gear to prevent rotation of the respective lever gear and to effect rotation of the respective first lever about the respective reel gear and drive of the first lever; and
    a pair of second levers, respectively operatively connected to the pair of first levers and to a swingable magnetic head support board carrying said pair of magnetic heads or pinch rollers, so that upon drive of the first lever, the board is rotated to rock by engagement with the respective second lever to thereby effect operation of the respective magnetic head or pinch roller.

2. The changeover mechanism according to claim 1, which further comprises a switch which is disposed adjacent to the corresponding unit of the pair of second levers, and is actuated to cut off power supply to the respective electromagnetic solenoid when contacted by the second lever rotated for engagement with the magnetic head support board or pinch roller support board.

3. The changeover mechanism according to claim 2, which further comprises a toggle spring for promoting the rotation of the magnetic head support board or pinch roller support board by the second lever.

4. The changeover mechanism according to claim 3, which further comprises a switch formed of a pair of fixed contacts and a movable contact which is disposed between the pair of fixed contacts and whose forward end is engaged with the magnetic head support board or pinch roller support board, and, when the movable contact is pressed against either of the pair of fixed contacts at the rotation of the magnetic head support board or pinch roller support board, indicates which unit of the pair of magnetic heads or the paired pinch rollers is projected for contact with a tape.

5. The changeover mechanism according to any one of claims 1 or 2 to 4, wherein each first lever comprises a lengthwise extending elongated hole into which extends a fixed pin acting as the rotation center of the respective second lever, a connector pin which is fitted to one end of the respective first lever, and a tension spring stretched between the connector pin and fixed pivotal pin; the connector pin being urged by another tension spring in a direction so as to prevent the revolution of the lever gear of the respective first lever about the reel gear; and each second lever being provided at one end thereof with an engagement portion engageable with the magnetic head support board or pinch roller support board, and at the other end thereof with a lengthwise extending elongated guide groove into which the connector pin of the respective first lever is loosely inserted.

6. The changeover mechanism according to claim 5, wherein the engagement portion of the second lever, is a notch, which is made engageable with the engagement pin mounted on the magnetic head support board or pinch roller support board.

* * * * *